Oct. 22, 1935.　　　P. T. CLARY　　　2,017,892
METHOD OF PROCESSING COFFEE
Filed April 24, 1933

INVENTOR
Patrick T. Clary
by Edward O. Lawrence
his Attorney

Patented Oct. 22, 1935

2,017,892

UNITED STATES PATENT OFFICE 2,017,892

METHOD OF PROCESSING COFFEE

Patrick T. Clary, Carnegie, Pa.

Application April 24, 1933, Serial No. 667,562

3 Claims. (Cl. 99—11)

Among the objects I have in view are the following.

The reduction in the loss in weight which in the present practice is experienced in the roasting of the coffee beans.

The improvement in the quality and flavor of the coffee.

The indefinite retention in the coffee after grinding of the improved flavor.

The impregnating of the coffee with suitable flavor-preserving or improving substances, such for instance as salt.

Other objects will appear from the following description.

Figure 1:
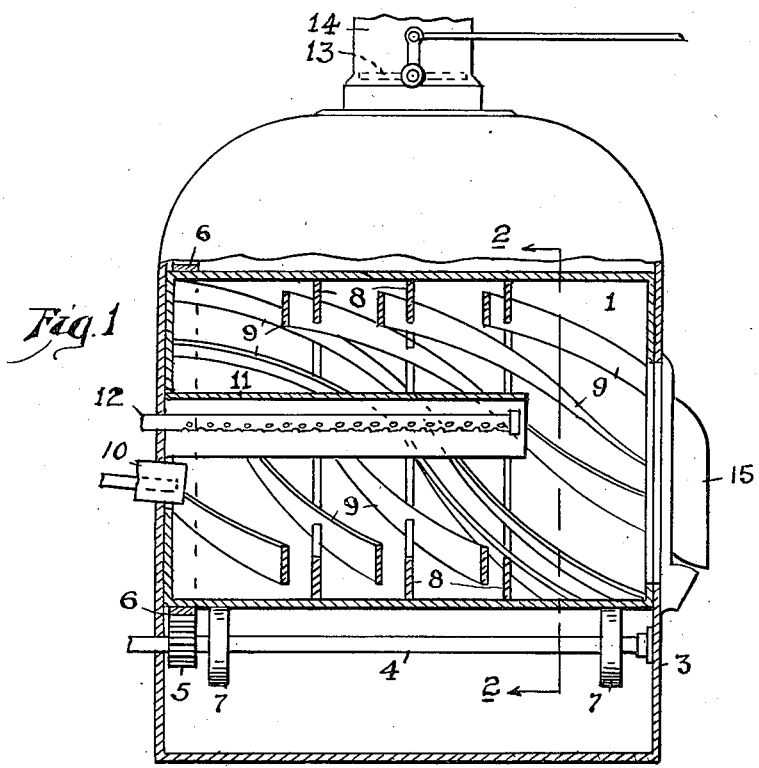
Figure 2:
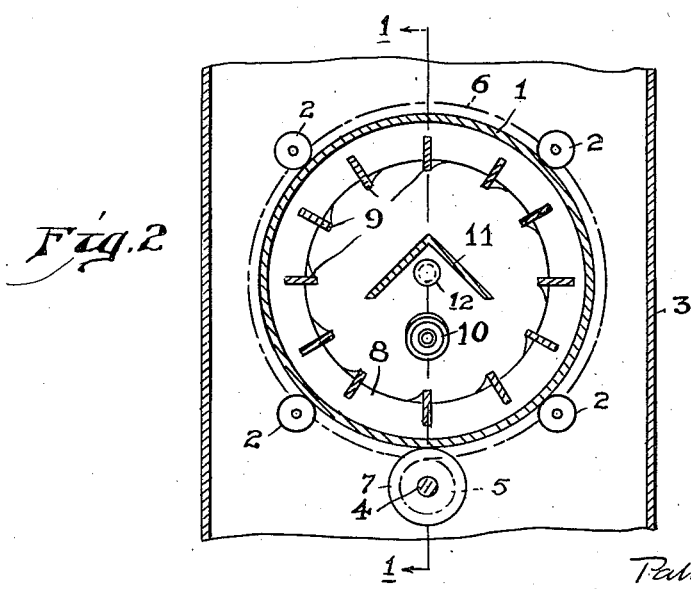

For the sake of clearness in describing the present practice and comparing therewith my improved method I have illustrated in the accompanying drawing a well known type of coffee-roasting machine, Fig. 1 being a longitudinal section thereof taken along the line 1—1 in Fig. 2.

Fig. 2 is a cross sectional view taken along the line 2—2 in Fig. 1.

In the present practice the coffee is loaded into the horizontally disposed drum 1 whose perimetral wall is perforated and which drum is rotatably mounted as on the rollers 2 within the roaster casing 3. The drum is rotated on a horizontal axis as by means of a suitably driven shaft 4 extending into the casing and carrying a pinion 5 which meshes with the ring gear 6 on the drum. The shaft 4 may also carry a pair of friction rollers 7 which assist in supporting and rotating the drum. The interior of the drum is provided with baffles 8 and 9 by means of which the blanket or layer of coffee which is carried by the inner wall surface of the drum is caused to shift longitudinally of the drum as the latter is revolved.

The heat for roasting the coffee is supplied by a gas burner 10 which extends through an opening in the casing 3 into one end of the drum 1. A stationary inverted V-shaped shield 11 extends into the end of the drum above the course of the flame from the burner. 12 is a perforated water pipe which extends into the drum within the shield 11.

In the present practice the drum 1 is rotated continuously during the processing of the coffee, the roasting being accomplished by means of the flame from burner 10, and the water being cut off from the pipe 12 during the roasting process. When the roasting operation has been completed the gas is cut off from burner 10 and water is admitted through the perforated pipe 12, the water being sprayed over the revolving blanket of coffee. During this process of adding moisture to the coffee the damper 13 in the exhaust stack 14 of the casing 3 is kept open in the present practice so that the steam which is generated by the impact of the water on the hot coffee beans is allowed to escape freely through the stack 14. When the generation of steam slackens off the water is cut off from the pipe 12 and the door 15 is opened, and the coffee beans are discharged from the roaster.

In the present practice the shrinkage in weight of the coffee resulting from the roasting process is relatively high, in the case of Santos coffee running from 14% to 16%. Further, shrinkage can not be successfully prevented by the addition of more water, because in such case the coffee beans become water-logged and lose their crispness and the flavor and quality of the ground coffee is seriously impaired.

In my improved process the operation is the same during the application of heat for roasting purposes but when the moisture or water is supplied to the coffee, after the burner has been shut off, the damper 13 is closed so that the steam which is generated can not escape up the stack 14 but is held in the casing and in the drum except for the relatively small percentage which escapes through the openings in the casing.

The damper however is not entirely closed at first but is left partially open, thus stopping the further roasting of the beans. Then the damper is fully closed to hold the steam in contact with the beans.

As the result of this confinement of the steam within the casing of the roaster I find that I am able to add a much larger quantity of water to a given quantity of coffee beans and I have in some cases doubled the amount of water used, as will appear from the test table hereinafter contained.

As the result of my improved method I am able to cut down the shrinkage in weight of the coffee very materially as will appear from the test table, such reduction running in said tests up to as much as over 4%.

I also found, after a long period of careful experiment, that although the shrinkage is reduced and more water is used, the coffee beans are as crisp as after treatment by the present process. Again the coffee treated by my present process when compared by expert coffee tasters with coffee of the same grade and character treated by the old process is graded considerably higher as to flavor and body. I may use either cold water or hot water in my method, but I prefer to first introduce the water cold to halt the roasting operation and then substitute hot water. If desired steam may be supplied through the pipe 12 instead of water either hot or cold.

The following is a table of tests made by the Pittsburgh Testing Laboratory in which various lots of Santos No. 4 coffee were processed by the present accepted practice and also by my improved method and the table shows the points of improvement which I have accomplished. Tests Nos. 1 and 2 were made with two bags of coffee each or about 264 pounds. Tests Nos. 3 and 4 were made with four bags each, or about 527 pounds. Tests Nos. 5 and 6 were also made with four bags each.

| Roast Number | 1 | 2 | 3 | 4 | 5 | 6 |
|---|---|---|---|---|---|---|
| Method | Old method | New method | Old method | New method | Old method | New method |
| Coffee used | No. 4 Santos | No. 4 Santos | No. 4 Santos | No. 4 Santos | No. 4 Santos | No. 4 Santos |
| Duration of roast in minutes | | | 28 | 14½ | 30½ | 26 |
| Water added | | | 5 gal. | | 5 gal. | 10 gal. |
| Steaming interval—min | | | 1:20 | 1:40 | 1:40 | 3:15 |
| Green weight, lbs | 263 | 264.5 | 526.0 | 527.0 | 526.0 | 526.0 |
| Roasted weight, lbs | 224 | 232.5 | 442.5 | 465.5 | 442.5 | 464.5 |
| Shrinkage, lbs | 39 | 32 | 83.5 | 61.5 | 83.5 | 61.5 |
| Shrinkage, percent | 14.8 | 12.1 | 15.9 | 11.7 | 15.9 | 11.7 |
| Analysis of roasted coffee: | | | | | | |
| Moisture | 1.54 | 3.62 | 1.48 | 4.76 | 1.80 | 3.68 |
| Oils (ether extract) | 15.62 | 12.60 | 11.20 | 9.40 | 13.60 | 12.70 |
| Cold water extract | 25.45 | 23.9 | 22.32 | 21.62 | 29.05 | 29.10 |
| Acidity of cold water extract | 6.45 | 5.81 | | | 6.09 | 5.92 |
| Acidity of ether extract | | | | | .04 | .04 |
| Ash | 3.79 | 3.77 | 4.17 | 4.19 | 4.21 | 4.09 |

It will be noted that the shrinkage in the case of Roast No. 1 amounted to 14.8%, while in Roast No. 2 it amounted to 12.1%. Again in Roast No. 3 it amounted to 15.9%, while in Roast No. 4 it amounted to 11.7%. In Roast No. 5 it amounted to 15.9% and in Roast No. 6 it amounted to 11.7%. Roasts Nos. 1, 3 and 5 were made by the old practice, while Roasts Nos. 2, 4 and 6 were made by my improved process.

Thus the average shinkage by the old process was 15.53%, while the average shrinkage by the new process was 11.83%, giving an average reduction by the new process of 3.7%.

A number of interesting phenomena are evident from these tests. Thus it will be noted that the moisture content of the product is greatly increased when my improved method is used, and thus there is a great saving in weight. This is also shown by comparing the green weight and the roasted weight as shown by the above tests. It is also noted that the oils (ether extract) are less in amount in the product of my improved process than they are in the product of the old process. As the deterioration in coffee is often caused as the result of rancidity in coffee the reduction of the oils in the product is of advantage.

An examination of the foregoing tests will show many other advantages to one skilled in the art of coffee roasting.

Frequently it is desired to add substances to coffee to improve its flavor and more often to keep it from having a bitter taste. Thus in restaurants where the coffee is made in large quantities, as in coffee urns, and is allowed to stand for a considerable time the made coffee tends to become bitter and sometimes salt is added to the liquid coffee to prevent its deterioration in taste.

With my improved process it is feasible and advantageous to add the salt to the water which is introduced into the coffee after the roasting has been accomplished and before the coffee is discharged from the roaster.

If the salt be added in the present process it will be deposited on the outer surface of the coffee beans and will be dislodged when the coffee is handled and ground, but I have found that with my improved process the salt may be successfully introduced by being added to the water or steam during the processing and that it will become impregnated throughout the coffee beans and thus will be retained by the coffee when ground.

By the use of my improved process I am able to obtain superior grades of prepared coffee from the same quality and character of raw coffee beans.

I claim:—

1. The method of processing coffee beans which comprises the steps of roasting the beans, then applying moisture to the heated beans and confining the resultant steam in contact with the beans to properly impregnate the latter.

2. The method of processing coffee beans which comprises the steps of roasting the coffee beans, then spraying water on the heated beans and confining the resultant steam in contact with the beans to properly impregnate the latter.

3. The method of processing coffee beans which comprises the steps of first roasting the beans, then spraying the heated beans with water containing in solution a suitable flavor-influencing substance such as salt, and then confining the resultant steam in contact with the beans to impregnate the beans with such substance.

PATRICK T. CLARY.